(12) United States Patent
Yu et al.

(10) Patent No.: US 11,936,612 B2
(45) Date of Patent: *Mar. 19, 2024

(54) ADDRESS RESOLUTION HANDLING AT LOGICAL DISTRIBUTED ROUTERS

(71) Applicant: VMware, Inc., Palo Alto, CA (US)

(72) Inventors: Jia Yu, San Jose, CA (US); Xinhua Hong, Campbell, CA (US); Yong Wang, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,247

(22) Filed: Jul. 29, 2022

(65) Prior Publication Data
US 2022/0385621 A1    Dec. 1, 2022

Related U.S. Application Data

(63) Continuation of application No. 16/507,045, filed on Jul. 10, 2019, now Pat. No. 11,463,398.

(51) Int. Cl.
*H04L 61/103* (2022.01)
*H04L 45/00* (2022.01)
(Continued)

(52) U.S. Cl.
CPC ............ *H04L 61/103* (2013.01); *H04L 45/44* (2013.01); *H04L 45/586* (2013.01); *H04L 45/66* (2013.01);
(Continued)

(58) Field of Classification Search
CPC ................. H04L 61/103; H04L 45/745; H04L 2101/622; H04L 45/74; H04L 61/00; H04L 45/44; H04L 45/586; H04L 45/66
See application file for complete search history.

(56) References Cited

U.S. PATENT DOCUMENTS 8,139,497 B2   3/2012   Estrada et al.
9,531,676 B2   12/2016  Wang et al.
(Continued)

OTHER PUBLICATIONS

Vmware, Inc., "Add an Edge Services Gateway", available at <URL: https://docs.vmware.com/en/VMware-NSX-Data-Center-for-vSphere/6.4/com.vmware.nsx.admin.doc/GUID-1EA25D37-F1C7-45C8-AEBA-A555ACC972BC.html>, May 31, 2019, 7 pages.
(Continued)

*Primary Examiner* — Lesa M Kennedy
(74) *Attorney, Agent, or Firm* — King Intellectual Asset Management

(57) ABSTRACT

Example methods for a network device to perform address resolution handling. The method may comprise: in response to a first distributed router (DR) port of a first DR instance detecting an address resolution request from a second DR port of a second DR instance, generating a modified address resolution request that is addressed from a first address associated with the first DR port instead of a second address associated with the second DR port. The modified address resolution request may be broadcasted within a logical network that is connected to the first DR instance through network extension. The method may also comprise: in response to detecting an address resolution response that includes protocol-to-hardware address mapping information associated with an endpoint located on the logical network, generating and sending a modified address resolution response towards the second DR port of the second DR instance.

21 Claims, 8 Drawing Sheets

(51) Int. Cl.
  *H04L 45/44* (2022.01)
  *H04L 45/586* (2022.01)
  *H04L 45/745* (2022.01)
  *H04L 101/00* (2022.01)
  *H04L 101/622* (2022.01)

(52) U.S. Cl.
  CPC ........ *H04L 45/745* (2013.01); *H04L 2101/00* (2022.05); *H04L 2101/622* (2022.05)

(56) References Cited

U.S. PATENT DOCUMENTS

| | | |
|---|---|---|
| 9,548,965 B2 | 1/2017 | Wang et al. |
| 9,575,782 B2 | 2/2017 | Chandrashekhar et al. |
| 2015/0103842 A1 | 4/2015 | Chandrashekhar et al. |
| 2016/0094396 A1 | 3/2016 | Chandrashekhar et al. |
| 2017/0093618 A1* | 3/2017 | Chanda ............... H04L 41/0803 |
| 2019/0123962 A1* | 4/2019 | Guo ........................ H04L 41/40 |
| 2019/0312820 A1* | 10/2019 | Yu ........................... H04L 45/74 |
| 2021/0014192 A1 | 1/2021 | Yu et al. |

OTHER PUBLICATIONS

Rashmi Bhardwaj, "Proxy ARP for Layer 2 Extension", available at <URL: https://ipwithease.com/proxy-arp-for-layer-2-extension/>, Apr. 10, 2015, 8 pages.

\* cited by examiner

ADDRESS RESOLUTION HANDLING AT LOGICAL DISTRIBUTED ROUTERS

CROSS-REFERENCE TO RELATED APPLICATION

The present application is a continuation under 35 U.S.C. § 120 of U.S. patent application Ser. No. 16/507,045, filed on Jul. 10, 2019, and entitled "ADDRESS RESOLUTION HANDLING AT LOGICAL DISTRIBUTED ROUTERS," now issued as U.S. Pat. No. 11,463,398, which is incorporated herein by reference in its entirety.

BACKGROUND

Virtualization allows the abstraction and pooling of hardware resources to support virtual machines in a virtualized computing environment, such as a software-defined data center (SDDC). For example, through server virtualization, virtual machines running different operating systems may be supported by the same physical machine (also referred to as a "host"). Each virtual machine is generally provisioned with virtual resources to run an operating system and applications. The virtual resources may include central processing unit (CPU) resources, memory resources, storage resources, network resources, etc.

Address resolution refers to the process of resolving a protocol address (e.g., Internet Protocol (IP) address) to a hardware address (e.g., Media Access Control (MAC) address). For example, address resolution may be required when a source wishes to communicate with a destination. To learn the hardware address of the destination, the source broadcasts a request message that includes a known protocol address of the destination. In response, the destination will send a response message that includes its hardware address. Other recipients are not required to respond to the broadcasted request message. In practice, address resolution may be handled more efficiently, especially in extended logical layer-2 networks.

DETAILED DESCRIPTION

Figure 1A:
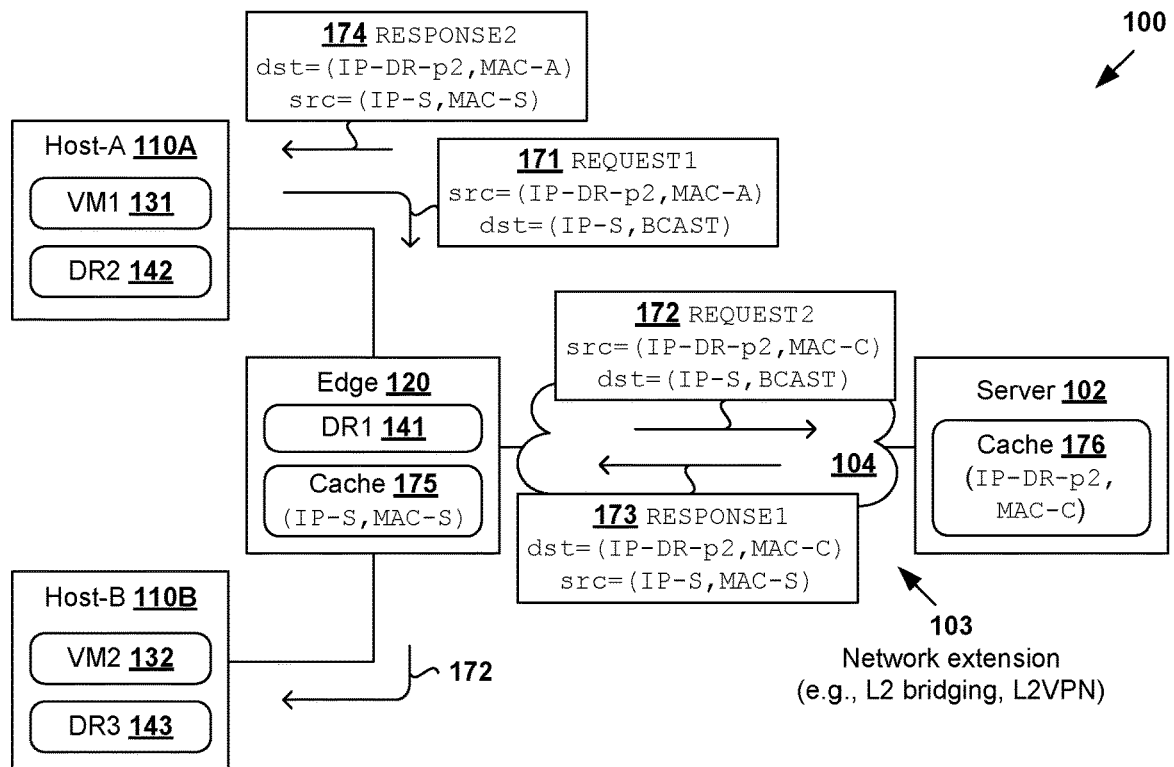
FIG. 1A is a schematic diagram illustrating an example physical implementation view of a software-defined networking (SDN) environment in which address resolution handling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1B:
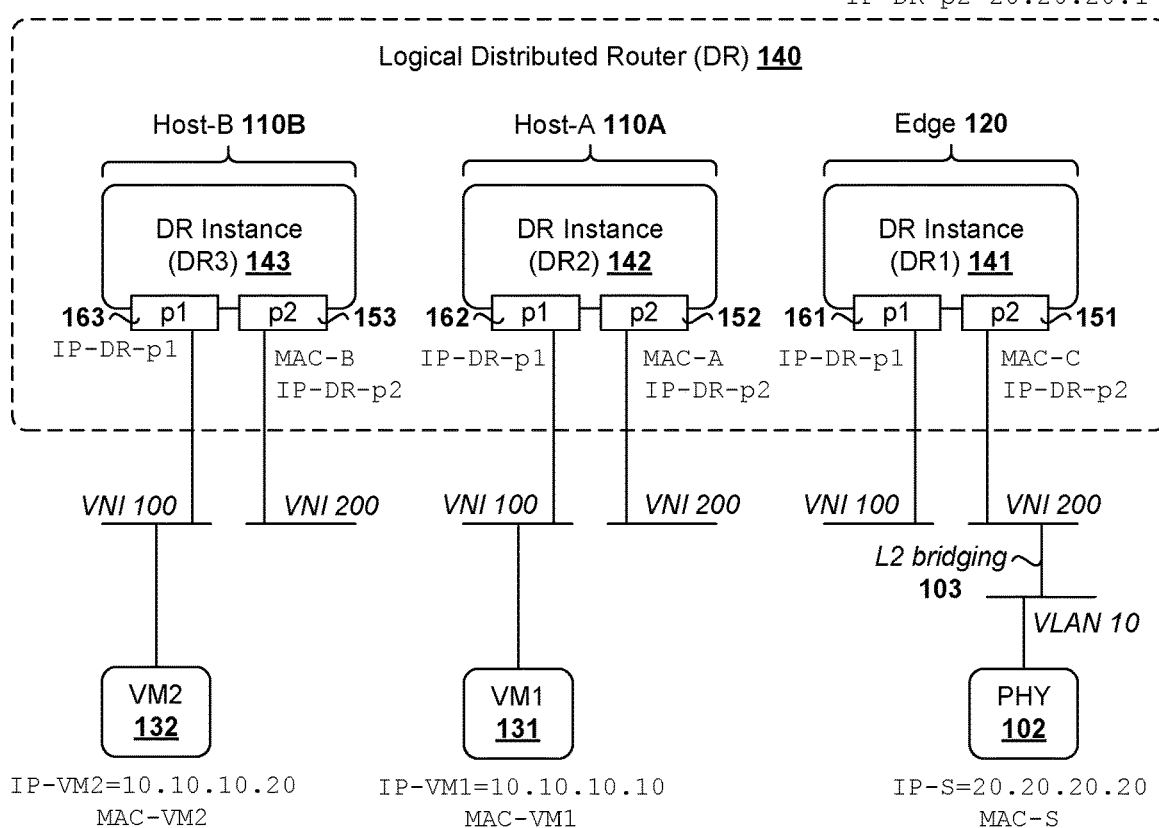
FIG. 1B is a schematic diagram illustrating an example management plane view of a logical distributed router (DR) in the SDN environment in FIG. 1A.
Figure 2:
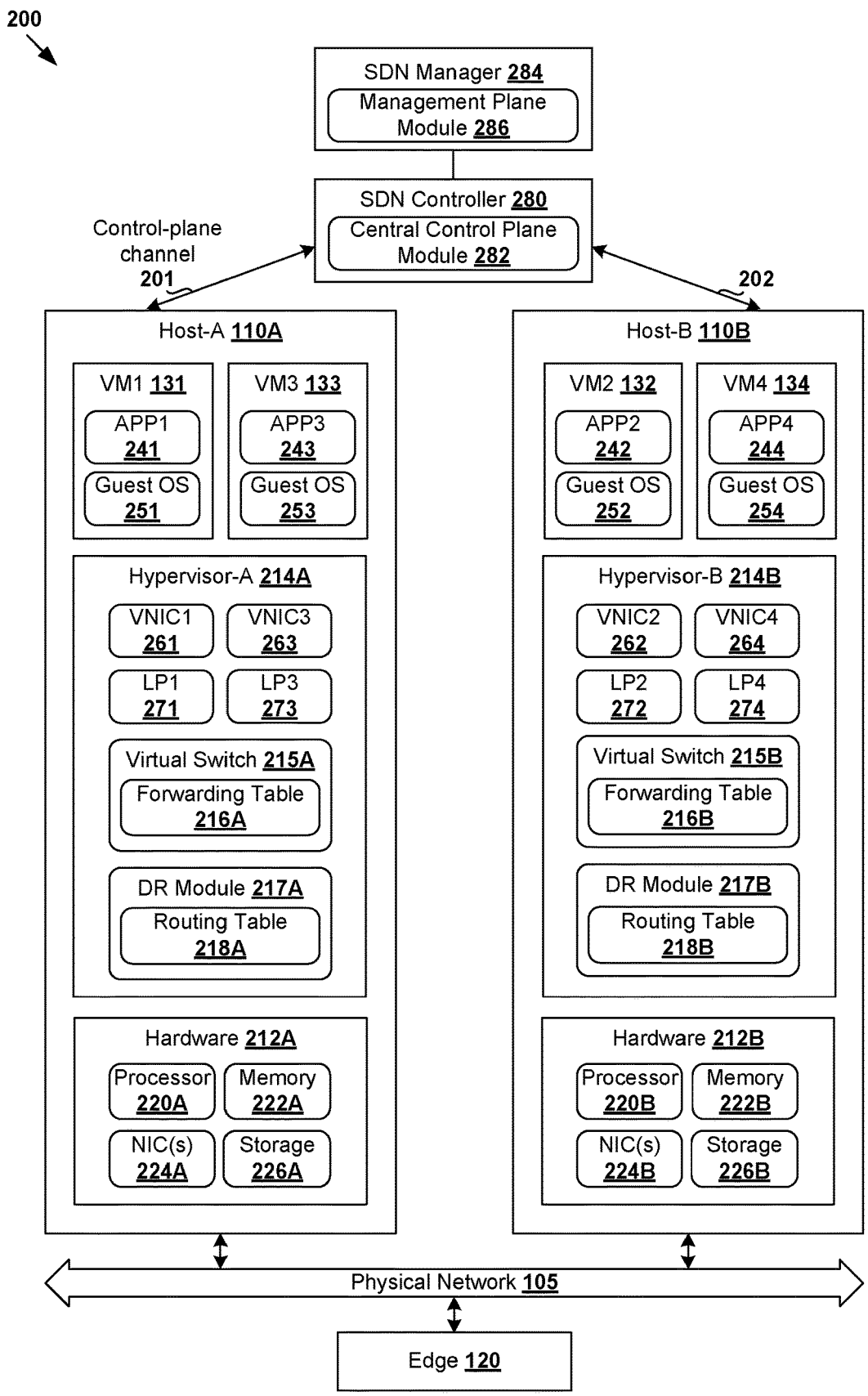
FIG. 2 is a schematic diagram illustrating an example detailed physical implementation view of the SDN environment in FIG. 1A.

Challenges relating to address resolution will now be explained using FIG. 1A, FIG. 1B and FIG. 2. In particular, FIG. 1A is a schematic diagram illustrating an example physical implementation view of software-defined networking (SDN) environment 100 in which address resolution handling may be performed. FIG. 1B is a schematic diagram illustrating an example management plane view of a logical distributed router (DR) in SDN environment 100 in FIG. 1A. FIG. 2 is a schematic diagram illustrating example detailed physical implementation view 200 of SDN environment 100 in FIG. 1A. In practice, SDN environment 100 may include additional and/or alternative components than that shown in FIG. 1A, FIG. 1B and FIG. 2.

Referring first to FIG. 1A, SDN environment 100 includes multiple hosts, such as host-A 110A and host-B 110B that are connected to edge 120. In practice, SDN environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

Referring to a more detailed view in FIG. 2, hosts 110A-B each include virtualization software (e.g., hypervisor 214A/214B) that maintains a mapping between underlying hardware 212A/212B and virtual resources allocated to VMs 131-134. Hosts 110A-B are interconnected via physical network 105. Hardware 212A/212B includes suitable physical components, such as processor(s) 220A/220B; memory 222A/222B; physical network interface controller(s) or NIC(s) 224A/224B; and storage disk(s) 228A/228B accessible via storage controller(s) 226A/226B, etc. Virtual resources are allocated to each VM to support guest operating system (OS) 251/252/253/254 and application(s) 241/242/243/244. Corresponding to hardware 212A/212B, the virtual resources may include virtual CPU, guest physical memory, virtual disk, virtual network interface controller (VNIC), etc. Hardware resources such as VNICs 261-264 may be emulated using virtual machine monitors (VMMs), which may be considered as part of (or alternatively separated from) corresponding VMs 131-134.

Hypervisor 214A/214B further implements virtual switch 215A/215B and DR instance 217A/217B to handle egress packets from, and ingress packets to, corresponding VMs 131-134. Packets may be received from, or sent to, each VM via an associated logical port. For example, logical ports 271-274 are associated with respective VMs 131-134. Here, the term "logical port" may refer generally to a port on a logical switch to which a virtualized computing instance is connected. A "logical switch" may refer generally to a software-defined networking (SDN) construct that is collectively implemented by virtual switches 215A-B in the example in FIG. 1, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them). The term "packet" may refer generally to a group of bits that can be transported together from a source to a destination, such as message, segment, datagram, etc.

Although examples of the present disclosure refer to virtual machines, it should be understood that a "virtual machine" running on a host is merely one example of a "virtualized computing instance." or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Further in FIG. 2, SDN controller 280 and SDN manager 284 are example network management entities that facilitate implementation of software-defined networks (e.g., logical overlay networks). One example of an SDN controller is the NSX controller component of VMware NSX® (available from VMware, Inc.) that operates on a central control plane. SDN controller 280 may be a member of a controller cluster (not shown for simplicity) that is configurable using SDN manager 284 operating on a management plane. Network management entity 280/284 may be implemented using physical machine(s), VM(s), or both. Logical switches, logical routers, and logical overlay networks may be configured using SDN manager 284, SDN controller 280, etc. To send or receive control information, local control plane (LCP) agent (not shown) on host 210A/210B may interact with central control plane module 282 at SDN controller 280 via control-plane channel 201/202. SDN manager 284 implements management plane module 286.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Generic Routing Encapsulation (GRE), Internet Protocol Security (IPSec), Virtual eXtensible Local Area Network (VXLAN), Stateless Transport Tunneling (STT), Virtual Local Area Network (VLAN), Generic Network Virtualization Encapsulation (GENEVE), Network Virtualization using Generic Routing Encapsulation (NVGRE), Layer 2 Tunneling Protocol (L2TP), any combination thereof, etc. For example, VXLAN is a layer-2 overlay scheme on a layer-3 network that uses tunnel encapsulation to extend layer-2 segments across multiple hosts which may reside on different layer 2 physical networks. In the example in FIG. 1, VM1 131 on host-A 110A and VM2 132 on host-B 110B may be connected to the same logical switch and located on the same logical layer-2 segment, such as a segment with VXLAN (or "virtual") network identifier (VNI)=100.

Logical switches and logical distributed routers may be implemented in a distributed manner and can span multiple hosts and edge 120. For example, logical switches that provide logical layer-2 connectivity may be implemented collectively by virtual switches 215A-B and represented internally using forwarding tables 216A-B at respective virtual switches 215A-B. Forwarding tables 216A-B may each include entries that collectively implement the respective logical switches. Further, logical distributed routers that provide logical layer-3 connectivity may be implemented collectively by DR modules 217A-B and represented internally using routing tables 218A-B at respective DR modules 217A-B. Routing tables 218A-B may be each include entries that collectively implement the respective logical distributed routers.

Referring now to FIG. 1B, logical DR 140 (also known as a virtual distributed router (VDR)) may be collectively implemented by multiple DR instances. First DR instance (DR1) 141 is associated with edge 120 (e.g., bare metal machine or VM) and implemented using any suitable DR instance and routing table (not shown for simplicity). Second DR instance (DR2) 142 is associated with host-A 110A and implemented by hypervisor-A 114A (e.g., using DR instance 217A and routing table 218A). Third DR instance (DR3) 143 is associated with host-B 110B and implemented by hypervisor-B 114B (e.g., using DR instance 217B and routing table 218B). Edge 120 may implement a logical service router (SR), which represents a centralized routing component that is deployed to provide centralized stateful services, such as firewall protection, load balancing, network address translation (NAT), etc.

In the example in FIG. 1A, consider the communication between a pair of virtual machines, such as VM1 131 on host-A 110A and VM2 132 on host-B 110B. Both VM1 131 and VM2 132 are located on the same subnet=10.10.10.0/24 associated with VNI=100. When VM1 131 wishes to communicate with VM2 132, VM1 131 needs to find out the hardware address (e.g., MAC address) of VM2 132. The process of resolving or translating a known protocol address (e.g., IP address) to an unknown hardware address is known as address resolution. In IP-based networks, address resolution may be performed using Address Resolution Protocol (ARP) for IP version 4 (IPv4) addresses or Neighbor Discovery Protocol (NDP) for IP version 6 (IPv6) addresses.

Using ARP as an example, VM1 131 may broadcast an ARP request within logical network with VNI=100 to translate IP address=IP-VM2 of VM2 132 to its corresponding MAC address. Each recipient will examine whether its IP address matches with that in the ARP request. Since its IP address=IP-VM2, VM2 132 will respond with an ARP response with MAC address=MAC-VM2. The ARP response is a unicast message that is only sent to VM1 131. VM1 131 caches protocol-to-hardware address mapping information (IP-VM2, MAC-VM2) in an ARP table entry, which expires if VM1 131 does not communicate with VM2 132 within a predefined period of time. After the ARP table entry expires, VM1 131 will have to repeat the above process to relearn the MAC address of VM2 132. The address resolution process may be repeated by other virtual machines in a similar manner.

Address Resolution Handling at Logical Dr Ports

According to examples of the present disclosure, address resolution handling may be performed in SDN environment 100 where endpoints (e.g., VMs 131-132 and physical server 102) are interconnected through network extension (see 103) supported by edge 120. As used herein, the term "network extension" may refer generally to any suitable network configuration that extends or stretches a logical layer-2 network (and corresponding broadcast domain) across multiple geographical sites. In practice, any suitable network extension may be used, such as layer-2 network bridging (e.g., VNI-VLAN bridging), layer-2 virtual private network (L2VPN), etc. The term "network extension" is sometimes referred to as data center interconnect (DCI), data center extension (DCE), stretched layer-2 network, extended layer-2 network, stretched deploy, etc.

For example in FIG. 1B, VM1 131 and VM2 132 may be located on VNI=100 associated with first IP subnet=10.10.10.0/24 at a first site. Physical server 102 may be located on VLAN 10 associated with second IP subnet=20.20.20.0/24 at a second site. Through network extension 103 supported by edge 120 over physical network 104, VMs 131-132 and physical server 102 may appear on the same broadcast domain. A first set of logical DR ports 161-163 (labelled "p1") on respective DR instances 141-143 of logical DR 140 is assigned with the same IP address=IP-DR-p1 (e.g., 10.10.10.1). A second set of logical DR ports 151-153 (labelled "p2") on respective DR instances 141-143 is assigned with another IP address=IP-DR-p2 (e.g., 20.20.20.1). This way, even when a VM migrates from one host to another, its default gateway IP address may remain unchanged.

To facilitate communication between VM1 131 and physical server 102 located on different subnets, a protocol address (e.g., IP-S) of physical server 102 needs to be resolved into a hardware address (e.g., MAC-S). An example will be explained using FIG. 3, which is a flowchart of example process 300 for a network device to perform address resolution handling in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. In practice, example process 300 may be implemented using any suitable "network device" supporting a "first DR instance" (e.g., edge 120 associated with DR1 141), etc.

As used herein, the term "network device" (e.g., edge 120; also referred to as "computer system" or "appliance") may refer generally to an entity that is capable of performing functionalities of a switch, router (e.g., logical service router), bridge, gateway, edge appliance, or any combination thereof. It should be understood that edge 120 may be implemented using one or more virtual machines (VMs) and/or physical machines (also known as "bare metal machines"). The term "DR instance" may refer generally to one of multiple routing components of a logical DR. The multiple routing components are usually distributed across respective multiple entities (e.g., hosts 110A-B and edge 120). The term logical "DR port" or "logical DR port" may refer generally to a logical interface of a DR instance. Each DR port usually connects to a particular network segment (e.g., VNI=100 for "p1" and VNI=200 for "p2").

Figure 3:
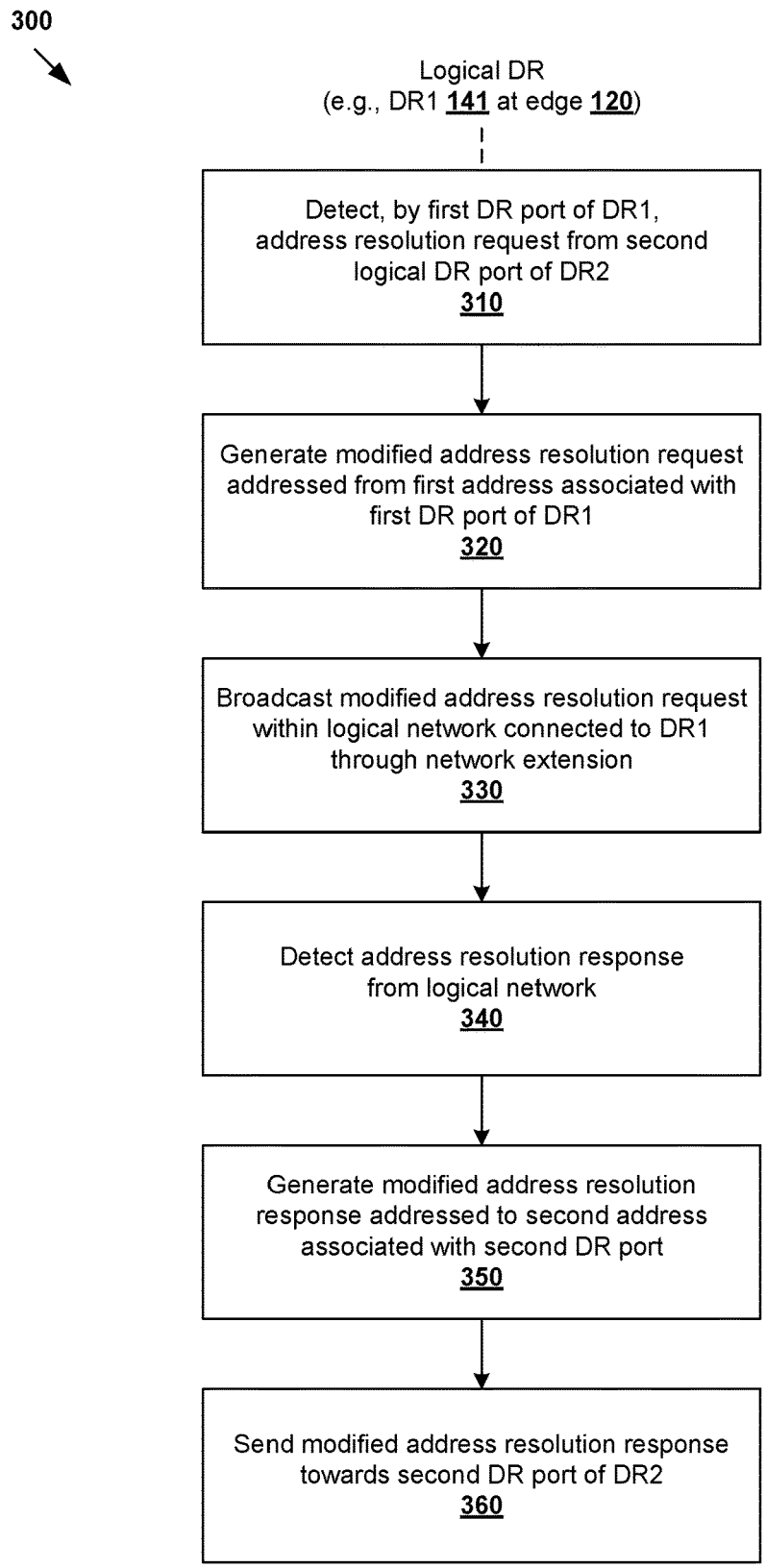
FIG. 3 is a flowchart of an example process for address resolution handling at a logical DR in an SDN environment.

At 310 in FIG. 3, first DR port 151 of DR1 141 may detect an address resolution request (see "REQUEST1" 171 in FIG. 1) from second DR port 152 of DR2 142. In the example in FIGS. 1A-1B, address resolution request 171 is addressed from (IP address=IP-DR-p2, MAC address=MAC-A). Here, IP-DR-p2 may be an IP address assigned to both DR ports 151-152. MAC-A may be a physical MAC address associated with second DR port 152, or more particularly to hypervisor 114A supporting DR2 142 on host-A 110A. REQUEST1 171 also specifies a known protocol address (e.g., IP-S) to be resolved.

At 320-330 in FIG. 3, a modified address resolution request (see "REQUEST2" 172) may be generated and broadcasted. In the example in FIGS. 1A-1B, block 320 may involve modifying a source MAC address field in REQUEST1 171 to replace MAC-A associated with second DR port 152 with MAC-C associated with first DR port 151. Block 330 may involve broadcasting REQUEST2 172 within a logical network (e.g., VLAN 10) that is connected to DR1 141 through network extension (e.g., VXLAN-VLAN bridging by edge 120).

At 340 in FIG. 3, first DR port 151 of DR1 141 may detect an address resolution response (see "RESPONSE1" 173) from the logical network. In the example in FIGS. 1A-1B, "RESPONSE1" 173 specifies protocol-to-hardware address mapping information (IP-S, MAC-S) associated with endpoint=physical server 102 located on VLAN 10. "RESPONSE1" 173 may be addressed to (IP address=IP-DR-p2, MAC address=MAC-C) associated with first DR port 151 of DR1 141.

At 350-360 in FIG. 3, a modified address resolution response (see "RESPONSE2" 174) may be generated and sent towards second DR port 152 of DR2 142. In the example in FIGS. 1A-1B, "RESPONSE2" 174 may be addressed to (IP address=IP-DR-p2, MAC address=MAC-A) associated with second DR port 152 of DR2 142 on host-A 110A. In practice, block 350 may involve modifying a destination MAC address field in "RESPONSE1" 173 to replace MAC-C with MAC-A.

According to examples of the present disclosure, first DR port 151 of DR1 141 and second DR port 152 of DR2 142 may each act as proxy (e.g., ARP proxy) to facilitate address resolution through network extension supported by edge 120. In the example in FIGS. 1A-1B, server 102 may also learn protocol-to-hardware address mapping information (IP-DR-p2, MAC-C) associated with first DR port 151 of DR1 141 (see cache 176 in FIG. 1) based on "REQUEST2" 172. In this case, examples of the present disclosure also reduce the likelihood of server 102 getting confused by the different (IP address, MAC address) configurations of DR ports 151-153.

For example, if server 102 receives "REQUEST1" 171 from host-A 110A without any modification, it will learn (IP-DR-p2, MAC-A) associated with DR port 152 of DR2 142. However, if server 102 receives a subsequent request from host-B 110B, it will relearn (IP-DR-p2, MAC-B) associated with DR port 153 of DR3 143. This process of MAC learning and relearning is inefficient, and may be exacerbated in SDN environments with a large number of hosts. Using examples of the present disclosure, address resolution handling may be improved and performed in a more efficient manner in SDN environment 100.

Depending on the desired implementation, MAC-C ("first address") may be a virtual MAC address associated with first DR port 151 of DR1 141. Here, the term "virtual MAC address" (e.g., MAC-C) may refer to a MAC address assigned to a logical element (e.g., first DR port 151 of DR1

141), Further, MAC-A ("second address") may be a physical MAC address associated with second DR port 152, or more particularly a physical address assigned to hypervisor 114A supporting DR2 142 on host-A 110A. The term "physical MAC address" may be a MAC address assigned to a physical entity (e.g., host-A 110A) for communication with another entity (e.g., edge 120).

As will be exemplified using FIGS. 4-8, examples of the present disclosure may be implemented to facilitate dynamic MAC learning in various "network extension" scenarios, such as layer-2 network bridging, multi-site network extension using layer-2 virtual private network (L2VPN), etc. In the case of layer-2 network bridging in FIGS. 1A-B and 5-6, the modified address resolution request may be broadcasted within a logical network (e.g., VLAN 10) that is connected to logical DR 140 through layer-2 network bridging.

Figure 7:
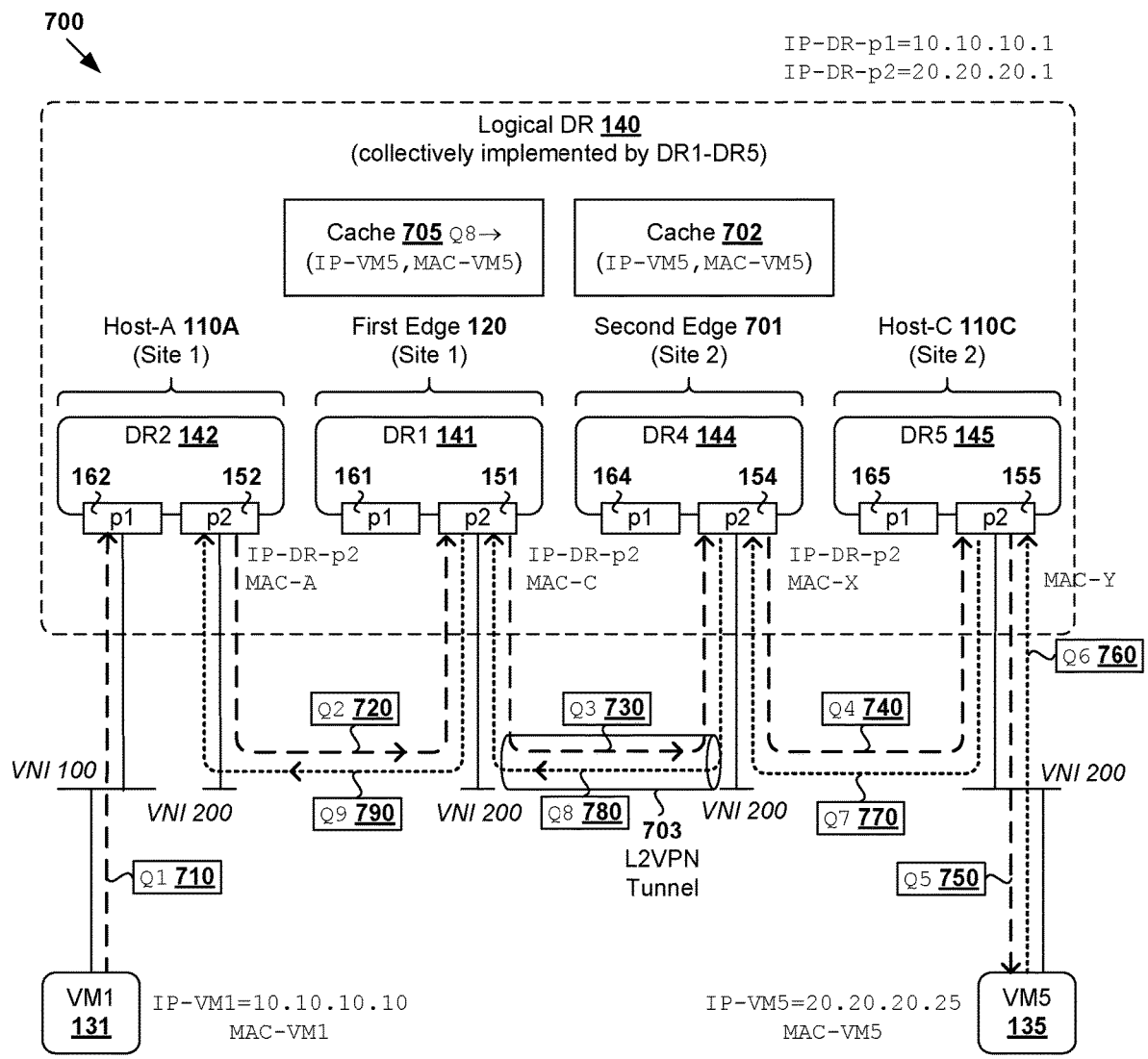
FIG. 7 is a schematic diagram illustrating example address resolution handling at a logical DR that supports multi-site layer-2 network extension.
Figure 8:
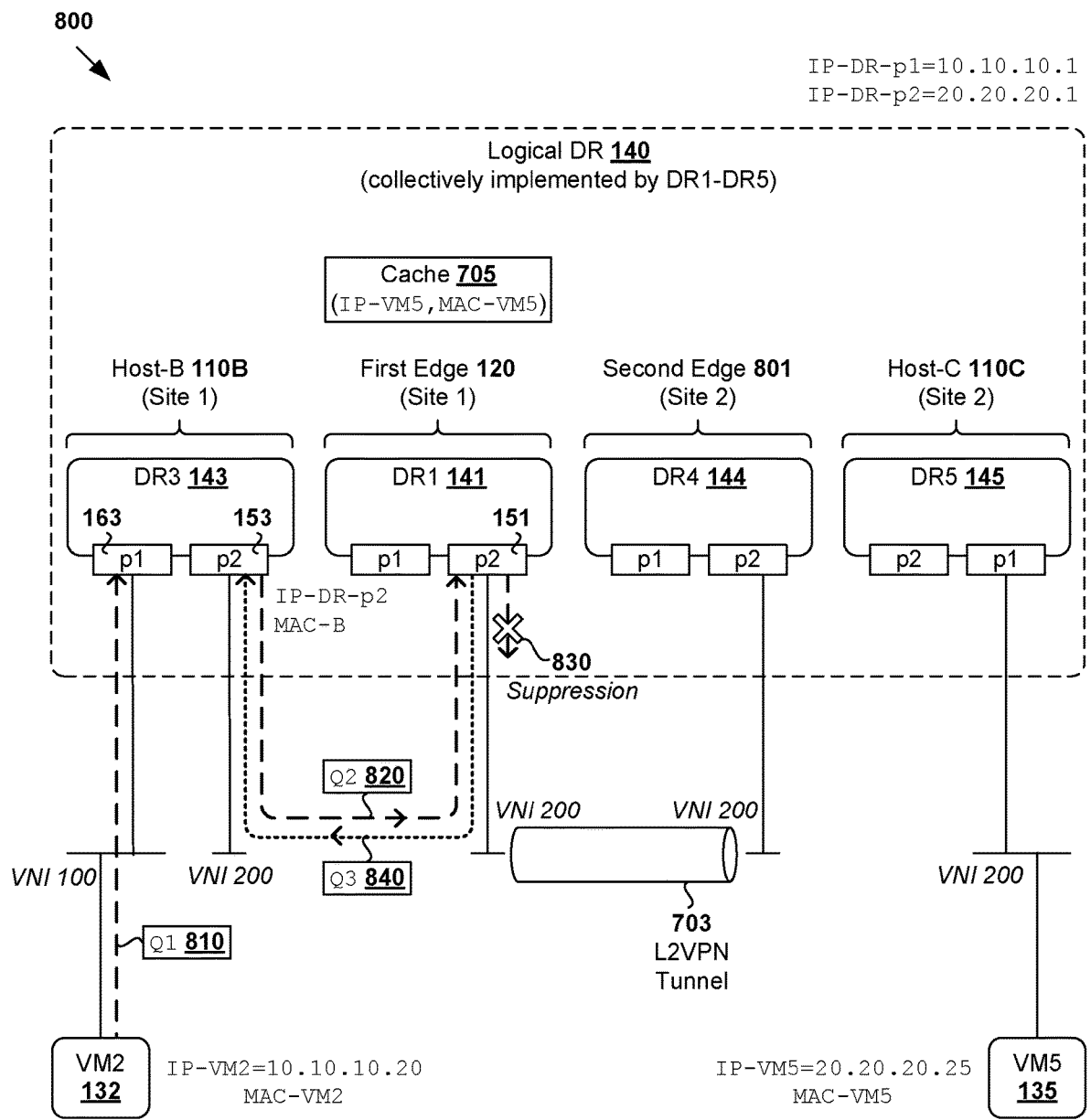
FIG. 8 is a schematic diagram illustrating example address resolution suppression in the example in FIG. 7.

In the case of multi-site network extension in FIGS. 7-8, the modified address resolution request may be broadcasted within a logical network (e.g., VNI=200) that is stretched across multiple sites. In this case, the first address resolution response may be received from an address resolution proxy at the second site (e.g., edge 701 in FIG. 7). By acting as an ARP proxy, logical DR 140 may support MAC learning and address resolution suppression to reduce the amount of broadcast traffic in SDN environment 100. This is beneficial when management entity 280/284 is unable to distribute the required protocol-to-hardware address mapping information. Throughout the present disclosure, address resolution will be exemplified using ARP. Any alternative protocol may be used, such as NDP, etc.

Layer-2 Network Bridging

Figure 4:
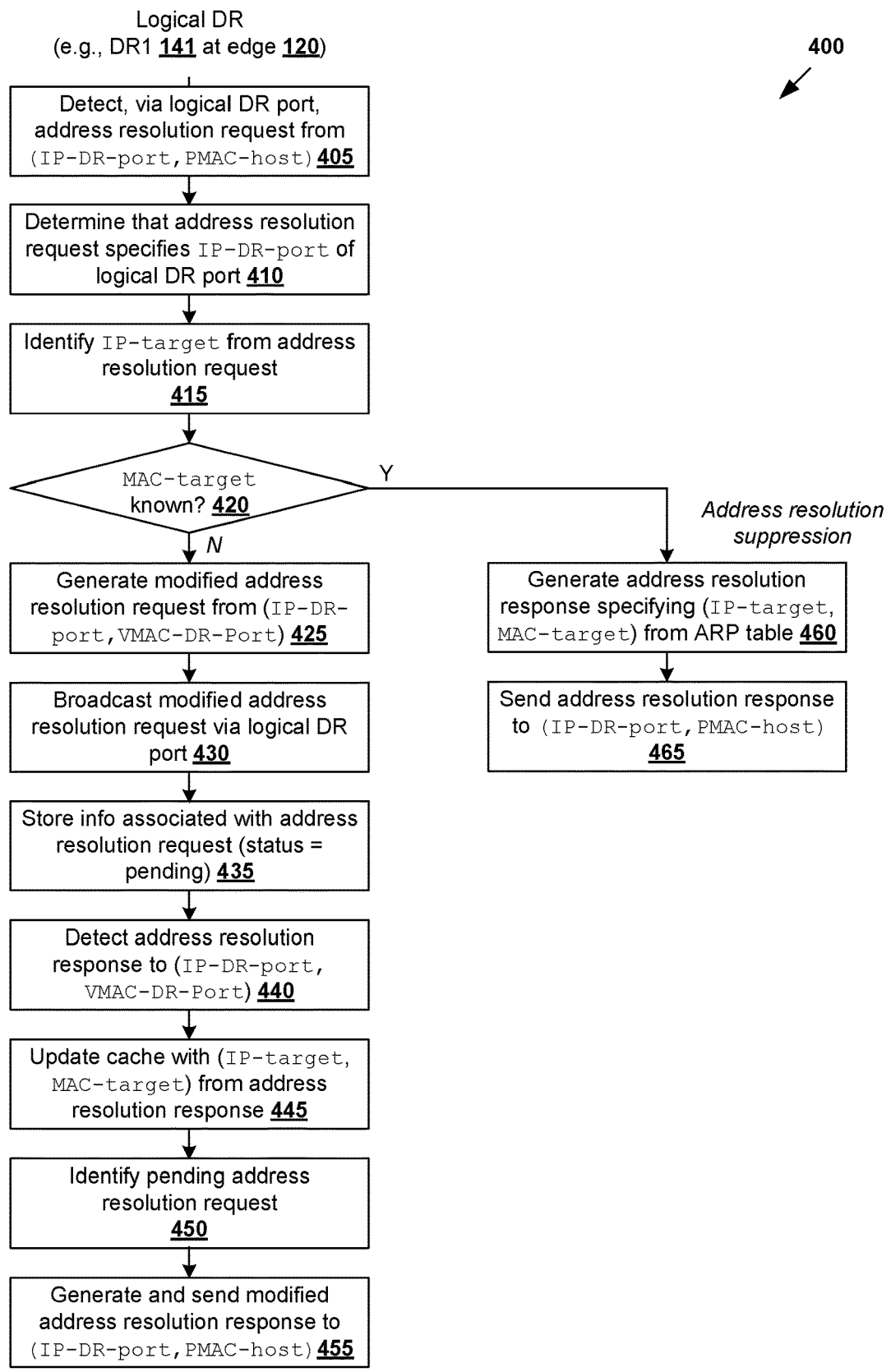
FIG. 4 is a flowchart of an example detailed process for address resolution handling at a logical DR in an SDN environment.
Figure 5:
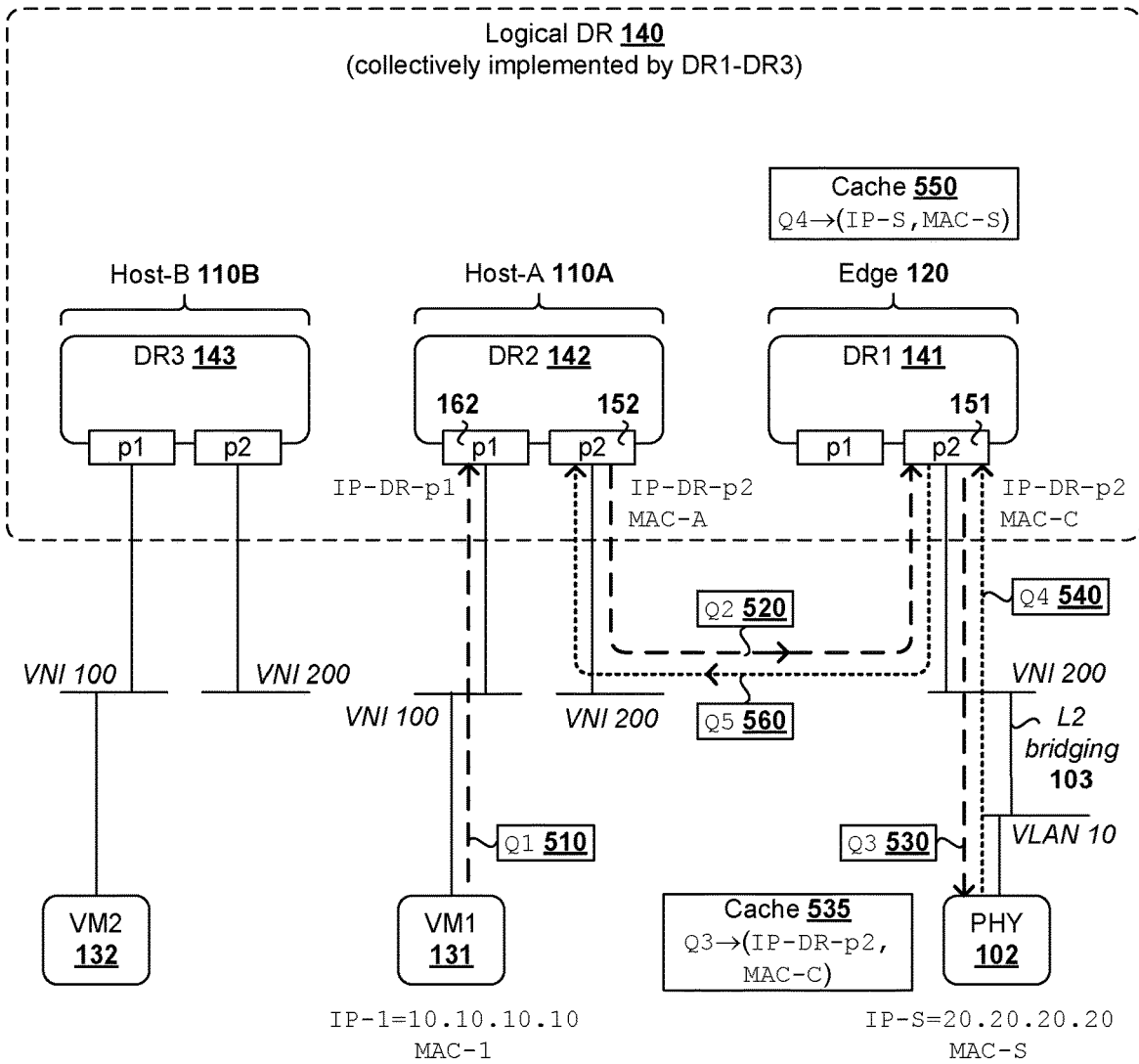
FIG. 5 is a schematic diagram illustrating example address resolution handling at a logical DR that supports layer-2 network bridging.
Figure 6:
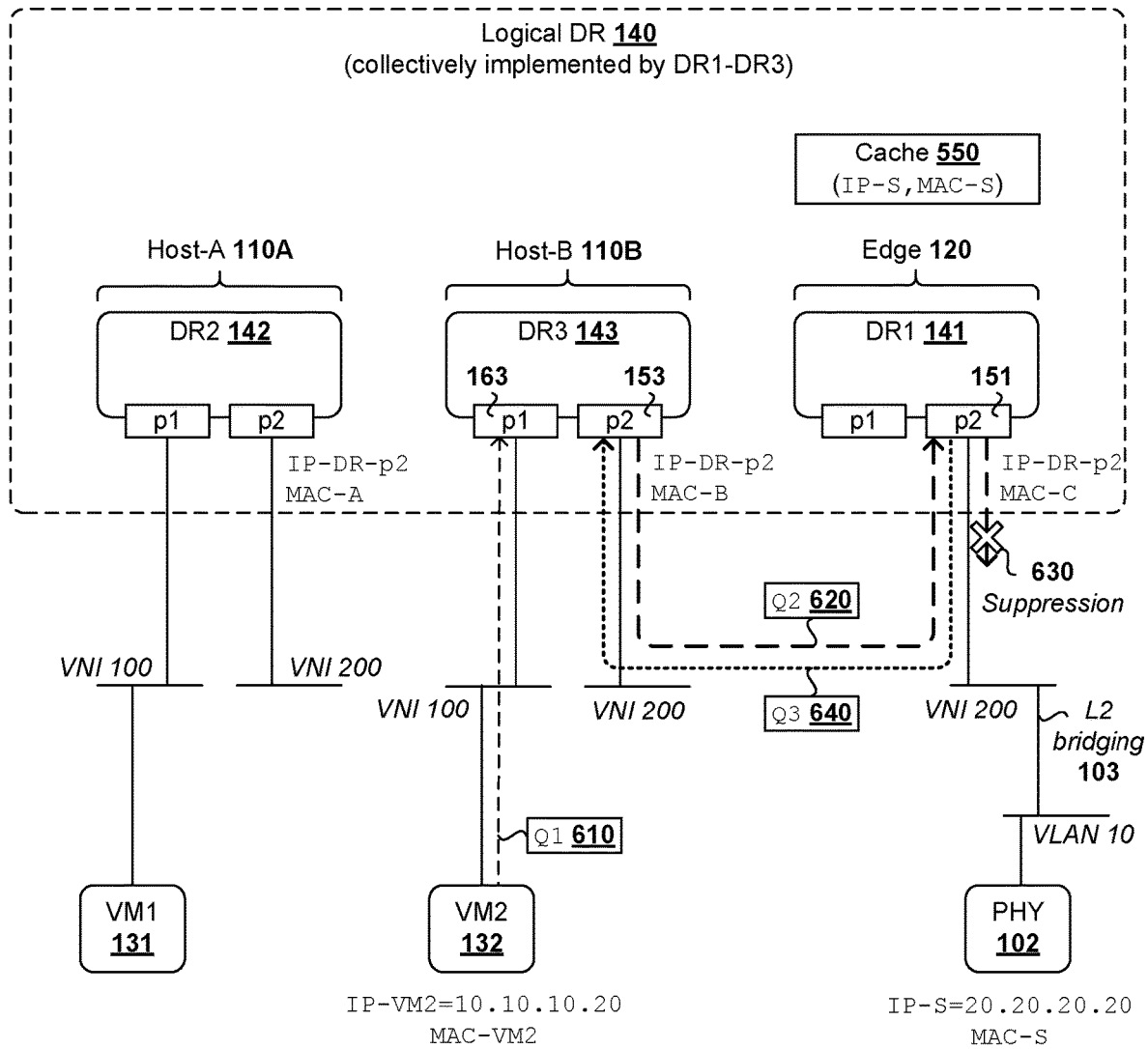
FIG. 6 is a schematic diagram illustrating example address resolution suppression in the example in FIG. 5.

A first example relating to layer-2 bridging will be discussed with reference to FIG. 4, FIG. 5 and FIG. 6. FIG. 4 is a flowchart of example detailed process 400 for address resolution handling at logical DR 140 in SDN environment 100. Example process 400 may include one or more operations, functions, or actions illustrated by one or more blocks, such as 410 to 465. The various blocks may be combined into fewer blocks, divided into additional blocks, and/or eliminated depending on the desired implementation. Example process 400 may be implemented by any suitable computer system or network device supporting a DR instance of logical DR 140, such as edge 120 supporting DR1 141. FIG. 5 is a schematic diagram illustrating example address resolution handling 500 at logical DR 140 that supports layer-2 bridging, while FIG. 6 is a schematic diagram illustrating example address resolution suppression 600 in the example in FIG. 5.

In the example in FIG. 5, edge 120 supports layer-2 bridging to "bridge" VNI 200 with VLAN 10. Through logical DR 140 and edge 120, VMs 131-132 and physical server 102 appear to be on the same (extended or stretched) logical network. Physical server 102 (e.g., bare metal server) is located on VLAN 10 and configured with IP address=20.20.20.20, which belongs to the same IP subnet as DR ports labelled "p2" 151-153, but different to that of VMs 131-132 (i.e., 10.10.10.0/24). In practice, physical server 102 may an entity that not managed by management entity 280/284. As such, management entity 280/284 is unable to disseminate control information identifying the MAC and IP address information of physical server 102 to hosts 110A-B and edge 120. As such, dynamic MAC learning through ARP requests and responses may be performed.

(a) Address Resolution Request

In the example in FIG. 5, consider a scenario where VM1 131 pings physical server 102 using ping packet 510 (labelled "Q1"). Ping packet 510 is addressed from source IP address=IP-VM1 (i.e., 10.10.10.10) associated with VM1 131 to destination IP address=IP-S (i.e., 20.20.20.20) associated with physical server 102. Based on routing information configured on VM1 131, ping packet 510 is sent to default gateway IP address=10.10.10.1 associated with DR port "p1" 162 of DR2 142.

In response to detecting ping packet 510 via DR port "p1" 161, DR2 142 on host-A 110A may generate and broadcast an ARP request (see "Q2" 520 in FIG. 5) within logical network with VNI=200 via DR port "p2" 152. ARP request 520 includes four addresses. Source protocol address (SPA) field specifies IP address=IP-DR-p2 associated with DR port "p2" 152 of DR2 142. Source hardware address (SHA) field specifies MAC address=MAC-A associated with DR port "p2" 152 of DR2 142. In practice, MAC-A may be a physical MAC address associated with hypervisor-A 114A. Destination or target protocol address (TPA) field specifies IP address=IP-S (i.e., 20.20.20.20) to be resolved. Since the MAC address of physical server 102 is unknown, destination or target hardware address (THA) field is set to a broadcast MAC address (e.g., FF:FF:FF:FF:FF:FF). DR2 142 then forwards ARP request 520 to DR1 141 and DR3 143. Note that ARP request 520 will be dropped by DR3 143 because there is no destination IP=IP-S.

Referring also to FIGS. 4, at 405 and 410, in response to DR port "p2" 151 detecting ARP request 520, DR1 141 may determine whether address resolution proxy functionality is required. Block 410 may involve examining SPA=IP-DR-p2 to determine that ARP request 520 originates from SHA=IP-DR-p2, which is the IP address shared by DR ports labelled "p2" 151-152 on respective DR1 141 and DR2 142. In this case, ARP request 520 will be intercepted.

At 415 and 420 in FIG. 4, DR1 141 may identify TPA=IP-S from ARP request 520 and determine whether its associated MAC address is known by checking a DR's neighbor cache associated with VNI=200. If unknown, at 425, modified ARP request 530 (labelled "Q3") may be generated for broadcast within VNI=200. In the example in FIG. 5, modified ARP request 530 may be generated from scratch, or by modifying ARP request 520. In particular, SHA=MAC-A is replaced with SHA=MAC-C, which may be a virtual MAC address associated with DR port "p2" 151 at DR1 141. Other fields may remain unchanged, such as SPA=IP-DR-p2, TPA=IP-S, and THA=FF:FF:FF:FF:FF:FF. Note that MAC address=MAC-C and IP address=IP-DR-p2 are associated with DR port "p2"151 at DR1 141 and denoted as (MAC-DR-Port, IP-DR-Port) in FIG. 4.

At 430 in FIG. 4, edge 120 may broadcast modified ARP request 530 within VNI=200 via DR port "p2" 151, which is bridged with VLAN 10 through VNI-VLAN bridging. Further, at 435, edge 120 stores (e.g., in a cache) information associated with (original) ARP request 520 to indicate that its status=pending. Note that ARP request 530 is also sent to DR3 143 on host-B 110B, where it will be dropped (not shown for simplicity).

In practice, ARP requests and responses may include other fields that are not shown in FIGS. 5-8 for simplicity. For example, a hardware type (HTYPE) may specify the type of hardware address (e.g., HTYPE=1 for MAC address); protocol type (PTYPE) may specify the type of protocol address (e.g., PTYPE=0x0800 for IPv4 address); hardware length (HLEN) may specify the hardware address length (e.g., HLEN=6 octets for a MAC address); protocol length (PLEN) may specify the protocol address length (e.g., PLEN=4 octets for an IPv4 address); and operation (OPER) may specify whether the packet is an ARP request (i.e., OPER=1).

(b) Address Resolution Response

In response to detecting ARP request 530, physical server 102 on VLAN 10 may determine that TPA=IP-S matches with its IP address. As such, physical server 102 with MAC address=MAC-S responds with ARP response 540 (labelled "Q4") specifying SHA=MAC-S, SPA=IP-S, THA=MAC-C (i.e., SHA in ARP request 530), TPA=IP-DR-p2 (i.e., SPA in ARP request 530).

At 440 in FIG. 4, in response to DR port "p2" 151 of DR1 141 detecting ARP response 540, edge 120 determines that ARP response 540 is addressed to (THA=MAC-C, TPA=IP-DR-p2) associated with DR port "p2" 151. In this case, at 445, edge 120 dynamically learns protocol-to-hardware address mapping information (IP address=IP-S, MAC address=MAC-S) associated with physical server 102. The address mapping information may be stored in DR's neighbor cache 550 in FIG. 5. Note that cache 550 may be stored in association with an L3 DR port instead of an L2 logical switch.

At 450 and 455 in FIG. 4, in response to identifying pending ARP request 520 from DR2 142, modified ARP response 560 (labelled "Q5") is generated and sent to DR port "p2" 152 of DR2 142 supported by host-A 110A in a unicast manner. Modified ARP response 560 specifies (SHA=MAC-S, SPA=IP-S, THA=MAC-A, TPA=IP-DR-p2). The pending status of ARP request 520 will also be removed.

(c) Address Resolution Suppression

By dynamically learning protocol-to-hardware address mapping information, subsequent ARP requests to resolve the same IP address may be suppressed to reduce the amount of broadcast traffic. In the example in FIG. 6, consider a scenario where VM2 132 on host-B 110B also wishes to communicate with physical server 102. Similarly, VM2 132 may send ping packet 610 (labelled "Q1") to IP address=IP-S. In response to detecting ping packet 610 from VM2 132 via DR port "p1" 163 of DR3 143, host-B 110B may generate and broadcast ARP request 620 (labelled "Q2") within VNI=200. ARP request 620 specifies (SHA=MAC-B, SPA=IP-DR-p2) associated with DR port "p2" 153 at DR3 143 and (TPA=IP-S, THA=FF:FF:FF:FF:FF:FF).

In response to DR port "p2" 152 of DR1 141 detecting ARP request 620, edge 120 determines that SPA=IP-DR-p2 is an IP address associated with DR port "p2" 151 at DR1 141. Edge 120 then performs a lookup to find TPA=IP-S in DR's neighbor cache 550. As such, edge 120 may suppress ARP request 620 (see 630 in FIG. 6). ARP response 640 (labelled "Q3") is then generated and sent to DR port "p2" 153 of DR3 143 on host-B 110B in a unicast manner. ARP response 640 specifies (SHA=MAC-S, SPA=IP-S, THA=MAC-B, TPA=IP-DR-p2). In practice, (IP-S=20.20.20.20, MAC-S) in DR's neighbor cache 550 may expire after a predefined period of time. Once expired, the address mapping information will be removed and blocks 405-455 may be repeated to re-learn the MAC address of physical server 102.

Multi-Site Network Extension

A second example relating to multi-site network extension will be discussed with reference to FIG. 4, FIG. 7 and FIG. 8. In particular, FIG. 7 is a schematic diagram illustrating example address resolution handling 700 at logical DR 140 that supports multi-site layer-2 network extension. FIG. 8 is a schematic diagram illustrating example address resolution suppression 800 at logical DR 140 in the example in FIG. 7. In an extended layer-2 network that is stretched across multiple sites, multiple levels of ARP proxy may be implemented for dynamic MAC learning and ARP suppression.

Referring first to FIG. 7, logical DR 140 is collectively implemented by multiple DR instances, including DR1 141 at first edge 120, DR2 142 at host-A 110A (not shown in FIG. 8), DR3 143 at host-B 110B (not shown in FIG. 7), DR4 144 at second edge 701 and DR5 145 at host-C 110C. Logical DR 140 is connected to multiple logical networks, such as VNI=100 and VNI=200. Again, each logical network may be configured with an IP subnet, such as 10.10.10.0/24 for VNI=100 and 20.20.20.0/24 for VNI=200. A first set of DR ports labelled "p1" (see 161-165) of logical DR 140 are configured with IP address=10.10.10.1, and a second set of DR ports labelled "p2" (see 151-155) with IP address=IP-DR-p2. Each DR port "p2" in the second set has a MAC address, such as physical MAC-C for DR port 151 at first edge 120; physical MAC-A for DR port 151 at host-A 110A and physical MAC-X for DR port 154 at second edge 701. At host-C 110C, DR port "p2" 155 connected to VM5 135 may be assigned with virtual MAC address=MAC-Y. These MAC addresses may be used in ARP requests and responses travelling between VM1 131 and VM5 135.

In practice, hosts 110A-C may be located at geographically-dispersed sites, such hosts 110A-B at a first site and host-C 110C at a second site. To facilitate communication between hosts 110A-C, first edge 120 may be deployed at the edge of the first site, and second edge 701 at the edge of the second site. First edge 120 and second edge 701 may communicate via any suitable tunnel, such as L2VPN tunnel 703. In practice, edge 120/701 may be any suitable network device that is implemented using one or more virtual machines (VMs) and/or physical machines (also known as "bare metal machines") capable of performing functionalities of a switch, router, bridge, gateway, any combination thereof, etc. Through edge 120/701, an extended logical network with VNI=200 may be stretched across multiple sites.

(a) Address Resolution Request

In the example in FIG. 7, consider a scenario where VM1 131 at a first site wishes to communicate with VM5 135 at a second site. VM1 131 and VM5 135 belong to different IP subnets, which are 10.10.10.0/24 and 20.20.20.0/24 respectively. In this case, VM1 131 generates and sends ping packet 710 (labelled "Q1") with source IP address=10.10.10.10 and destination IP address=IP-VM5. Based on routing information at VM1 131, ping packet 710 will be sent to default gateway IP address=10.10.10.1 associated with DR port labelled "p1" at DR2 142.

At host-A 110A, in response to detecting ping packet 710 via DR port "p1" 162 of DR2 142 on host-A 110A, ARP request 720 (labelled "Q2") is generated and broadcasted in logical network with VNI=200. ARP request 720 specifies source information (SHA=MAC-A, SPA=IP-DR-p2) associated with of DR port "p2" 152 at DR2 142, and (THA=FF:FF:FF:FF:FF:FF, TPA=IP-VM5). Note that SHA=MAC-A may represent a physical MAC address associated with hypervisor 114A that implements DR2 142 on host-A 110A. ARP request 720 is then broadcasted through overlay tunnels to all transport nodes (e.g., hosts) connected to VNI=200.

At first edge 120, in response to DR port "p2" 151 of DR1 141 detecting ARP request 720, it is observed that SPA=IP-DR-p2 is an IP address associated with DR port "p2" 151. As such, first edge 120 acts as an ARP proxy to intercept ARP request 720. Modified ARP request 730 (labelled "Q3") specifying (SHA=MAC-C, SPA=IP-DR-p2) associated with DR port "p2" 151 at DR1 141 is then generated and broadcasted. This involves first edge 120 sending ARP request 730 to second edge 701 at the second site over L2VPN tunnel 703. Pending ARP request 720 will also be recorded. Note that SHA=MAC-C may be a physical MAC address associated with DR port "p2" 151 of DR1 141. See 405-435 in FIG. 4.

At second edge 701, ARP request 730 that is injected into L2VPN tunnel 703 at the first site is processed accordingly. In this example, second edge 701 acting as an ARP proxy may intercept modified ARP request 730 (labelled "Q3") and observe that SPA=IP-DR-p2 is an IP address associated with DR port "p2" 154. As such, second edge 701 may further modify the SHA field from MAC-C (i.e., physical MAC address of DR port "p2" 151 at first edge 120) to MAC-X (i.e., physical MAC address of DR port "p2" 154 at second edge 701). Modified ARP request 740 (labelled "Q4") specifying SHA=MAC-X is then broadcasted.

At host-C 110C, modified ARP request 740 (labelled "Q4") is further updated from SHA=MAC-X (i.e., physical MAC address of DR port "p2" 154 at second edge 701) to SHA=MAC-Y (i.e., virtual MAC address of DR port "p2" 155 at host-C 110C). The resulting modified ARP request 750 (labelled "Q5") specifying SHA=MAC-Y is then forwarded towards VM5 135. This way, VM5 135 will only see virtual MAC address=MAC-Y associated with DR port "p2" 155 at host-C 110C (instead of MAC-X, MAC-C and MAC-A, which may be confusing).

(b) Address Resolution Response

At VM5 135, in response to detecting modified ARP request (labelled "Q5") 750, physical server 102 on VLAN 10 may determine that TPA=IP-VM5 matches with its IP address. As such, VM5 135 responds with ARP response 760 (labelled "Q6") specifying SHA=MAC-VM5, SPA=IP-VM5, THA=MAC-Y (i.e., SHA in "Q5" 750), TPA=IP-DR-p2 (i.e., SPA in "Q5" 750). At DR 145, in response to DR port "p2" 155 detecting ARP response 760, THA=MAC-Y is replaced with THA=MAC-X, which is a physical MAC address of DR port "p2" 154 at second edge 701. See modified ARP response 770 (labelled "Q7").

The MAC address transformation continues as ARP response 760 is sent towards second edge 701, first edge 120 and host-A 110A. In particular, at DR4 144 of second edge 701, THA=MAC-X is replaced with THA=MAC-C, which is a physical MAC address of DR port "p2" 151 of DR1 141 at first edge 120. See modified ARP response labelled "Q8" 780 sent towards first edge 120 over tunnel 703. Second edge 701 may also learn address mapping information (IP address=IP-VM5, MAC address=MAC-VM5) in cache 702.

At DR1 141 of first edge 120, THA=MAC-C is replaced with THA=MAC-A, which is a physical MAC address of DR port "p2" 152 of DR2 142 on host-A 110A. See modified ARP response labelled "Q9" 790 sent towards DR2 142. First edge 120 may also learn address mapping information (IP address=IP-VM5, MAC address=MAC-VM5) in cache 705.

At host-A 110A, in response to receiving ARP response 760 via DR port "p2" 152 at DR2 142, (IP-VM5=20.20.20.25, MAC-VM5) may be stored an ARP table (not shown in FIG. 7) to facilitate subsequent cross-site communication between VM1 131 and VM5 135.

(c) Address Resolution Suppression

Based on ARP table 750 at first edge 120, subsequent ARP requests to resolve the same IP address may be suppressed to reduce the amount of broadcast traffic. Referring now to FIG. 8, VM2 132 on host-B 110B also wishes to communicate with VM5 135 on host-C 110C. Similarly, VM2 132 may send ping packet 810 (labelled "Q1") to IP address=IP-VM5. In response to detecting ping packet 810 via DR port "p1" 163 of DR3 143, host-B 110B may broadcast ARP request 820 (labelled "Q2") within VNI=200. ARP request 820 specifies (SHA=MAC-B, SPA=IP-DR-p2) associated with DR port "p2" 153 at DR3 143 and (THA=FF:FF:FF:FF:FF:FF, TPA=IP-VM5).

In response to detecting ARP request 810, edge 120 determines that SPA=IP-DR-p2 is also the IP address of DR port "p2" 151 at DR1 141. Edge 120 then finds TPA=IP-VM5 in cache 705. As such, ARP request 820 may be suppressed (see 830). Next, ARP response 840 (labelled "Q3") is generated and sent to host-B 110B in a unicast manner. ARP response 840 specifies (SHA=MAC-VM5, SPA=IP-VM5, THA=MAC-B, TPA=IP-DR-p2).

According to examples of the present disclosure, a multi-level ARP proxy may be implemented using logical DR 140. In the examples in FIG. 7 and FIG. 8, the multi-level ARP proxy may include a first ARP proxy implemented using DR port "p2" 151 of DR1 141 at first edge 120, and a second ARP proxy using DR port "p2" 154 of DR4 144 at second edge 701. To facilitate cross-site migration, the same default gateway IP address may be implemented across all downlink ports of logical DR 140 in both sites. Note that ARP request 720 is forwarded using multiple hops (from DR2 142 on host-A 110A to first edge 120 at the first site, and then to second edge 701 at the second site). The multi-level ARP implementation may be used to forward ARP response 730 via the same path from DR4 144 to DR2 142 via DR1 141.

Container Implementation

Although explained using VMs 131-135, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 131-135. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Network Device

The above examples can be implemented by hardware (including hardware logic circuitry), software or firmware or a combination thereof. The above examples may be implemented by any suitable computing device, computer system, network device, etc. The network device may include processor(s), memory unit(s) and physical NIC(s) that may communicate with each other via a communication bus, etc. The network device may include a non-transitory computer-readable medium having stored thereon instructions or program code that, when executed by the processor, cause the processor to perform processes described herein with reference to FIG. 1 to FIG. 8. For example, a computer system or network device (e.g., edge 120) supporting a DR instance of logical DR 140 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

The invention claimed is:

1. A method for a network device to operate as an address resolution protocol (ARP) proxy, the method comprising:
receiving, by a distributed router (DR) instance of a logical DR that is implemented on the network device, an ARP request to resolve an address of an endpoint;
modifying, by the network device, the ARP request to replace a source address in the ARP request with an address of the DR instance;
broadcasting, by the network device, the modified ARP request to a logical network that includes the endpoint and that is connected to the DR instance through a layer-2 network extension provided by the network device configured as an edge;
receiving, by the network device, an ARP response to the modified ARP request; and
modifying, by the network device, the ARP response to replace a destination in the ARP response with the source address of the ARP request.

2. The method of claim 1, wherein:
the logical DR is implemented as a plurality of DR instances on a corresponding plurality of hosts, including the DR instance implemented on the network device as a first DR instance implemented on the edge amongst the plurality of hosts,
each DR instance of the plurality of DR instances include a DR port having a same internet protocol (IP) address and a respective different media access control (MAC) address, and
modifying the ARP request to replace the source address in the ARP request with the address of the DR instance includes: modifying the ARP request to replace the MAC address of the DR port of a second DR instance, amongst the plurality of DR instances and implemented on a first host amongst the plurality of hosts, with the MAC address of the DR port of the first DR instance implemented on the edge.

3. The method of claim 2, wherein:
the logical network is supported by a physical server connected by the layer-2 network extension to the first DR instance implemented on the edge, and
only the IP address and MAC address of the DR port of the first DR instance implemented on the edge are seen and associated by the physical server, so as to prevent the physical server from associating the same IP address with the MAC address of the DR port of each of the other DR instances of the plurality of DR instances.

4. The method of claim 1, further comprising:
storing, by the network device in a cache, the address of the endpoint that is contained in the ARP response; and
suppressing, by the network device, subsequent ARP requests if the subsequent ARP requests are seeking to resolve the address of the endpoint that is stored in the cache,
wherein suppressing includes responding, by the network device, directly to the ARP requests by providing the address of the endpoint from the cache.

5. The method of claim 4, wherein the stored address in the cache expires after a period of time, and wherein the method further comprises repeating learning the address of the endpoint after the expiration.

6. The method of claim 1, wherein the logical network connected to the DR instance through the layer-2 network extension is on a same subnet as the DR instance.

7. The method of claim 1, wherein:
the network device configured as the edge comprises a first edge,
the logical network includes a second edge that implements another DR instance of the logical DR,
the another DR instance implemented on the second edge is connected to the DR instance implemented first edge through the layer-2 network extension, and
the another DR instance is on a same subnet as the DR instance.

8. A non-transitory computer-readable storage medium that includes a set of instructions which, in response to execution by a processor of a network device, cause the processor to perform a method for the network device to operate as an address resolution protocol (ARP) proxy, wherein the method comprises:
receiving, by a distributed router (DR) instance of a logical DR that is implemented on the network device, an ARP request to resolve an address of an endpoint;

modifying, by the network device, the ARP request to replace a source address in the ARP request with an address of the DR instance;

broadcasting, by the network device, the modified ARP request to a logical network that includes the endpoint and that is connected to the DR instance through a layer-2 network extension provided by the network device configured as an edge;

receiving, by the network device, an ARP response to the modified ARP request; and modifying, by the network device, the ARP response to replace a destination in the ARP response with the source address of the ARP request.

9. The non-transitory computer-readable storage medium of claim 8, wherein:

the logical DR is implemented as a plurality of DR instances on a corresponding plurality of hosts, including the DR instance implemented on the network device as a first DR instance implemented on the edge amongst the plurality of hosts, each DR instance of the plurality of DR instances include a DR port having a same internet protocol (IP) address and a respective different media access control (MAC) address, and modifying the ARP request to replace the source address in the ARP request with the address of the DR instance includes: modifying the ARP request to replace the MAC address of the DR port of a second DR instance, amongst the plurality of DR instances and implemented on a first host amongst the plurality of hosts, with the MAC address of the DR port of the first DR instance implemented on the edge.

10. The non-transitory computer-readable storage medium of claim 9, wherein:

the logical network is supported by a physical server connected by the layer-2 network extension to the first DR instance implemented on the edge, and only the IP address and MAC address of the DR port of the first DR instance implemented on the edge are seen and associated by the physical server, so as to prevent the physical server from associating the same IP address with the MAC address of the DR port of each of the other DR instances of the plurality of DR instances.

11. The non-transitory computer-readable storage medium of claim 8, wherein the method further comprises:

storing, by the network device in a cache, the address of the endpoint that is contained in the ARP response; and suppressing, by the network device, subsequent ARP requests if the subsequent ARP requests are seeking to resolve the address of the endpoint that is stored in the cache, wherein suppressing includes responding, by the network device, directly to the ARP requests by providing the address of the endpoint from the cache.

12. The non-transitory computer-readable storage medium of claim 11, wherein the stored address in the cache expires after a period of time, and wherein the method further comprises repeating learning the address of the endpoint after the expiration.

13. The non-transitory computer-readable storage medium of claim 8, wherein the logical network connected to the DR instance through the layer-2 network extension is on a same subnet as the DR instance.

14. The non-transitory computer-readable storage medium of claim 8, wherein:

the network device configured as the edge comprises a first edge, the logical network includes a second edge that implements another DR instance of the logical DR, the another DR instance implemented on the second edge is connected to the DR instance implemented first edge through the layer-2 network extension, and the another DR instance is on a same subnet as the DR instance.

15. A network device configured to operate as an address resolution protocol (ARP) proxy, the network device comprising:

a processor; and a non-transitory computer-readable medium having stored thereon instructions that, in response to execution by the processor, cause the processor to perform operations to:

receive, by a distributed router (DR) instance of a logical DR that is implemented on the network device, an ARP request to resolve an address of an endpoint;

modify, by the network device, the ARP request to replace a source address in the ARP request with an address of the DR instance;

broadcast, by the network device, the modified ARP request to a logical network that includes the endpoint and that is connected to the DR instance through a layer-2 network extension provided by the network device configured as an edge;

receive, by the network device, an ARP response to the modified ARP request; and modify, by the network device, the ARP response to replace a destination in the ARP response with the source address of the ARP request.

16. The network device of claim 15, wherein:

the logical DR is implemented as a plurality of DR instances on a corresponding plurality of hosts, including the DR instance implemented on the network device as a first DR instance implemented on the edge amongst the plurality of hosts, each DR instance of the plurality of DR instances include a DR port having a same internet protocol (IP) address and a respective different media access control (MAC) address, and the operations to modify the ARP request to replace the source address in the ARP request with the address of the DR instance include operations to: modify the ARP request to replace the MAC address of the DR port of a second DR instance, amongst the plurality of DR instances and implemented on a first host amongst the plurality of hosts, with the MAC address of the DR port of the first DR instance implemented on the edge.

17. The network device of claim 16, wherein:

the logical network is supported by a physical server connected by the layer-2 network extension to the first DR instance implemented on the edge, and only the IP address and MAC address of the DR port of the first DR instance implemented on the edge are seen and associated by the physical server, so as to prevent the physical server from associating the same IP address with the MAC address of the DR port of each of the other DR instances of the plurality of DR instances.

18. The network device of claim 15, wherein the instructions further cause the processor to perform operations to:

store, by the network device in a cache, the address of the endpoint that is contained in the ARP response; and suppress, by the network device, subsequent ARP requests if the subsequent ARP requests are seeking to resolve the address of the endpoint that is stored in the cache, wherein the operations to suppress include operations to respond, by the network device, directly to the ARP requests by providing the address of the endpoint from the cache.

19. The network device of claim 18, wherein the stored address in the cache expires after a period of time, and wherein the operations further include operations to repeat learning the address of the endpoint after the expiration.

20. The network device of claim 15, wherein the logical network connected to the DR instance through the layer-2 network extension is on a same subnet as the DR instance.

21. The network device of claim 15, wherein the instructions further cause the processor to:
   the network device configured as the edge comprises a first edge,
   the logical network includes a second edge that implements another DR instance of the logical DR,
   the another DR instance implemented on the second edge is connected to the DR instance implemented first edge through the layer-2 network extension, and
   the another DR instance is on a same subnet as the DR instance.

* * * * *